United States Patent [19]
Klicker et al.
[11] Patent Number: 4,787,145
[45] Date of Patent: Nov. 29, 1988

[54] TWO POSITION PORTABLE POWER TOOL HANGER STABILIZED BY SPRING AND DETENT

[76] Inventors: Garry L. Klicker; John B. Hackett, both of 6821 Cunningham Way, Sacramento, Calif. 95828

[21] Appl. No.: 23,140

[22] Filed: Mar. 9, 1987

[51] Int. Cl.[4] .............................................. B23D 45/16

[52] U.S. Cl. .................................... 30/296 A; 30/388; 248/291

[58] Field of Search .................. 30/381, 383, 388-391, 30/296 R, 296 A, 514; 248/37.3, 291

[56] References Cited

U.S. PATENT DOCUMENTS 3,583,106 6/1971 Dobbertin ......................... 30/123 X
3,850,401 11/1974 Snediker ............................. 248/291
4,406,064 9/1983 Goss .................................. 30/390 X

*Primary Examiner*—Douglas D. Watts

[57] ABSTRACT

A folding hanger assembly for a circular saw. It is fitted to circular saws with the aid of screw fasteners. It consists of a rod and bracket, that is fixed to the side of the saw. The interior width of the bracket is the same as the exterior width of the saw handle. This allows the hanger bracket to fit snugly over the saw handle. This snug fit prevents any rotating motion of the hanger which could cause excess pressure on the screws which fasten the hanger to the saw. There is a detent in the bracket and a spring for tension which provides an indexing action which holds the rod either flat against the saw or at a 90 degree angle from it. The hanger enables users, to safely hang their saws on roof rafters, floor joists or studs. It also folds out of the way when not is use.

3 Claims, 4 Drawing Sheets

TWO POSITION PORTABLE POWER TOOL HANGER STABILIZED BY SPRING AND DETENT

BACKGROUND OF INVENTION

1. Field of Invention

The invention relates to hangers for use on portable power tools such as electric saws, for example. Frequently, environmental conditions for operation are such that the tools must be supported in working areas where flat surfaces are not available and hanging means must be provided.

In wooden frame construction, for example, portable power tools such as electric saws are carried and operated in locations where there are no table-like supports. Thus, an operator must look to other means for supporting a tool when it is not in use. Frequently a carpenter, for example, is working on joists or in roof rafters where there are no floor supports and there is a need for structure on a portable saw for hanging the same on a joist. The known portable saws have no hangers by which saws can be conveniently and safely hung in such situations.

2. Description of Prior Art

I refer now to U.S. Pat. No. 4,406,064 to Goss. This tool is designed for uses similar to the Klicker-Hackett Hanger, but is not as convenient or versatile. The Goss tool will hang a saw fairly well on a horizontal joist. The Klicker-Hackett Hanger will safely hang the saw at any angle from horizontal to vertical. The Goss tool also increases the working height of the saw. This makes it difficult or impossible to get the saw between narrowly spaced rafters and joists, to make necessary cuts. Since the Klicker-Hackett Hanger attached to the side of the saw, it dosen't increase the saws height. The Klicker-Hackett Hanger folds flat against the side of the saw when not in use. Therefore it dosen't increase the saw's width either. Thus, it is a safer and more convenient tool than the Goss Hanger.

The following patents described various tool supporting devices but none are as efficient as the Klicker-Hackett two position hanger.

| | | | |
|---|---|---|---|
| 869,947 | 11/1907 | Tupper | |
| 1,116,847 | 11/1914 | Russell | |
| 1,303,908 | 5/1919 | Johnson | |
| 1,948,932 | 2/1934 | McMickle | 65/65 |
| 2,262,832 | 11/1941 | Caldwell | 145/35 |
| 2,309,990 | 2/1943 | Savi | 248/360 |
| 2,467,905 | 4/1949 | Ostberg | 248/360 |
| 2,730,803 | 1/1956 | Kimball | 30/167 |
| 2,841,192 | 7/1958 | Martin | 30/340 X |
| 3,886,658 | 6/1975 | Wikoff | 30/388 |
| 4,179,805 | 12/1979 | Yamada | 30/122 |
| 4,406,064 | 9/1983 | Goss | |

SUMMARY

Mr. Hackett and myself, carpenters and co-inventors of the aforementioned two position portable power tool hanger, until now have been frustrated in our efforts to find a tool that would hang a saw both efficiently and safely. Our invention will hang a saw on any rafter or joist, regardless of their angle. It will even hang on a vertical stud. No other tool is as versatile. The two position hanger doesn't increase the size or bulk of the saw. All other similar devices make the saw so bulky as to be totally nonfunctional in some critical places. The carpenters work area is a difficult and dangerous one.

Our device makes his work, not just easier but much safer. Thousands of saws are dropped from rafters or joists and severely damaged each year, primarily because of a lack of a proper hanging device. This creates an extreme hazard to anyone working below. Our invention could end these unfortunate circumstances.

DESCRIPTION OF PREFERRED EMBODIMENT

I will now refer to the included drawings in order to more easily and accurately describe how the invention works.

Figure 1:
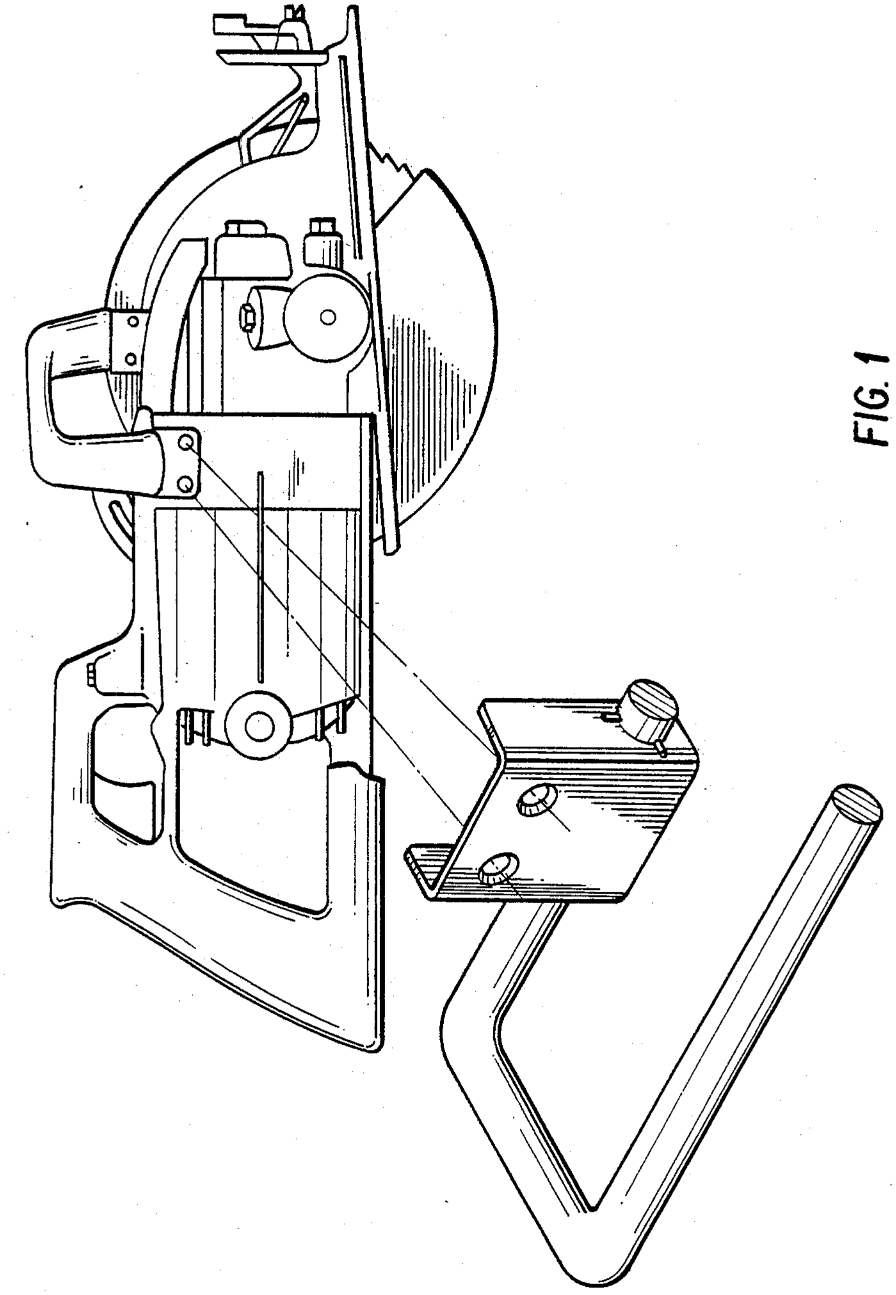
FIG. 1 is a side view of the Hanger and the saw to which it attaches, with lines drawn showing where it attaches. The invention is in the working position; the rod is indexed 90 degrees from the bracket.
Figure 2:
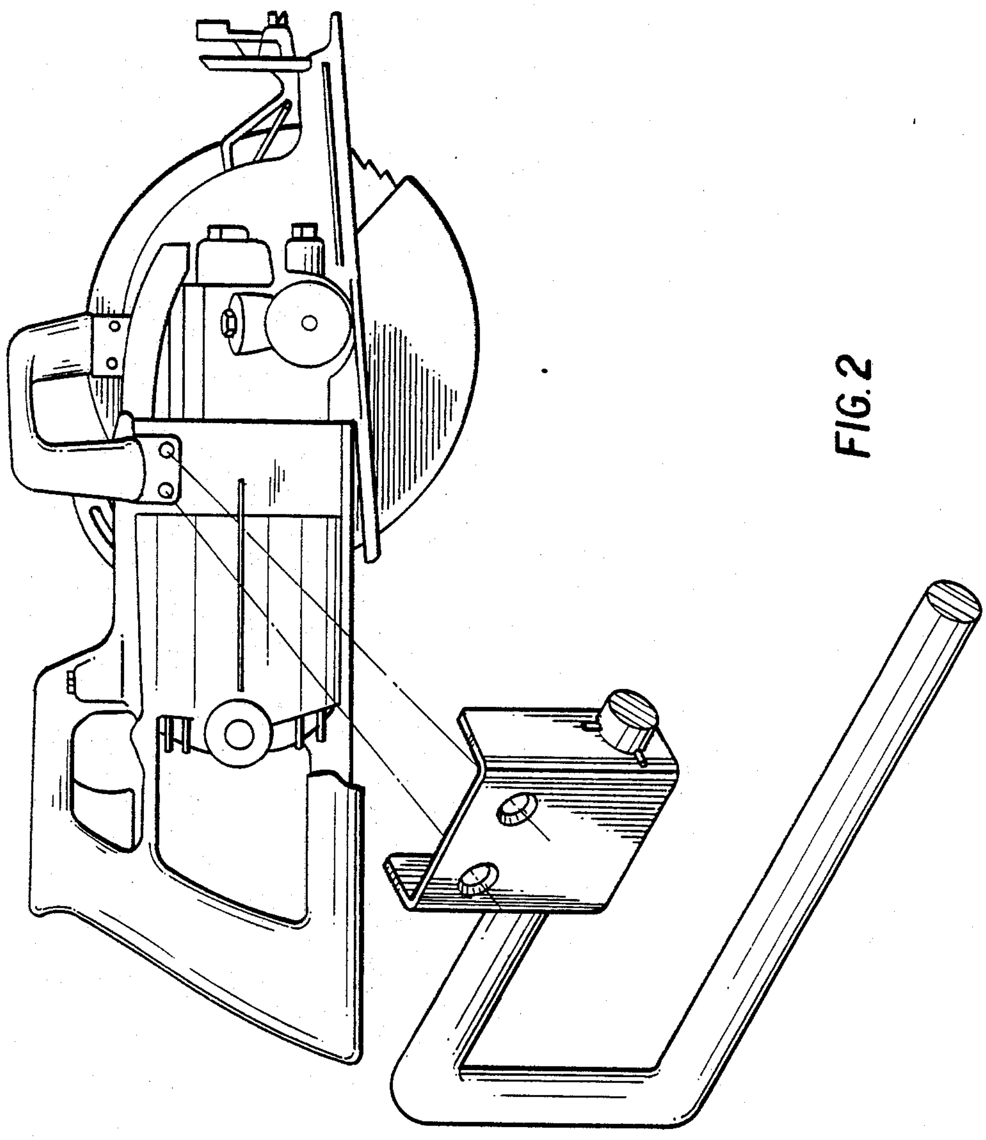
FIG. 2 is the same view as FIG. 1, except that the rod is indexed at 0 degrees, in line with the bracket. It fits flat against the saw in this position.
Figure 3:
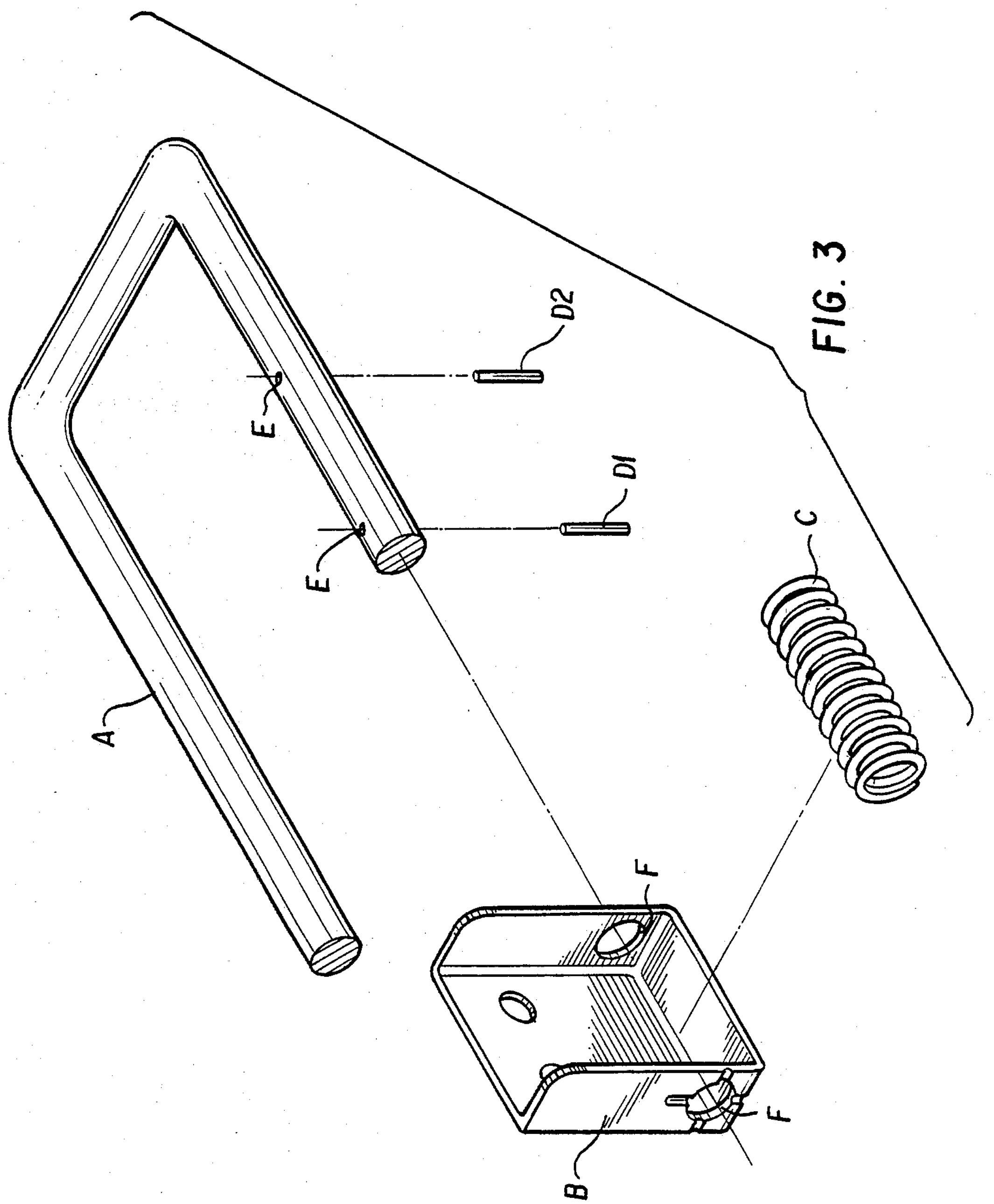
FIG. 3 is an exploded view of the invention illustrated in FIG. 1 and FIG. 2 showing all its individual components.
Figure 5:
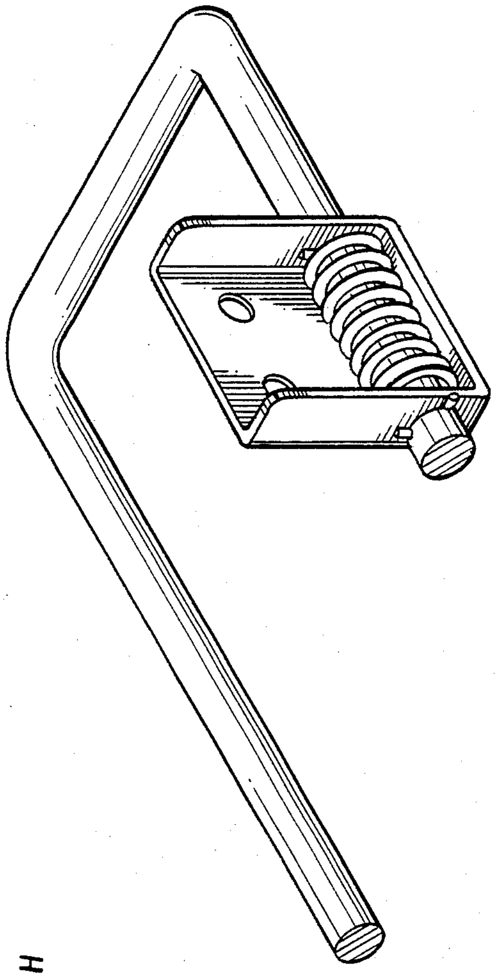
FIG. 5 is a perspective view of the invention from the back side, showing all components in assembled position.
Figure 4:
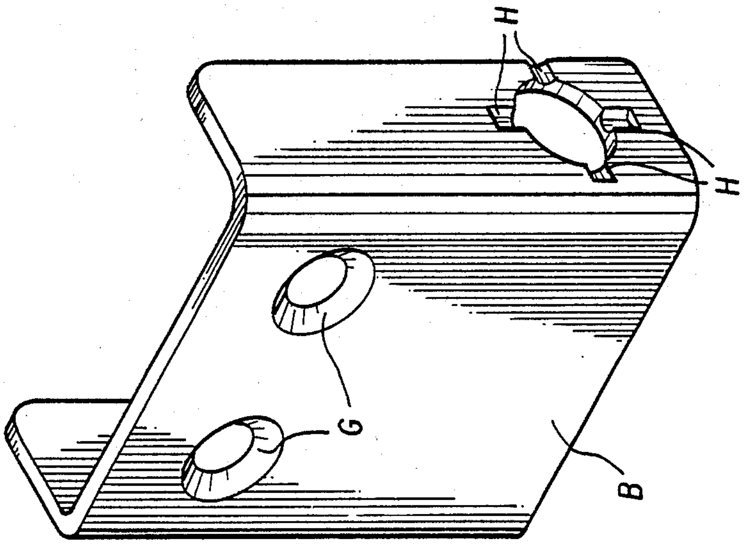
FIG. 4 is an enlarged view of the bracket, B, shown in FIG. 3, illustrating the detents, H, which in combination with the spring, C, and pins D1 and D2, indexes the rod. The countersunk holes, G, receive screws with tapered heads by which it attaches snugly to the saw.

Starting with FIG. 3, we see all the individual parts of the Klicker-Hackett Hanger. Note that the bracket, B, is closed on one end for added strength. The Spring, C, is fitted into the bracket, B, between the holes, F. The rod, A, is inserted through the holes, F, and the spring, G; the pins, D1 and D2, are then inserted through the holes, E. The product then appears s shown in FIG. 5. Referring now to FIG. 4, note the detents, H, in the bracket, B. These detents provide a seat for the pin, D1. The pin D2, compresses the spring, C, and the pin, D1, being held in the detents, H, provides the indexing of the rod, A. When the hanger is connected to the saw as in FIG. 1, a rod, A, indexed to 90 degrees away from the bracket, B, the invention becomes a hook on the side of the saw that will hang on any 1½" thick rafter, joist, or stud. Referring to FIG. 2, the rod, A, is indexed down to 0 degrees or the flat position. It will then lie flat against the side of the saw and thus be completely out of the way. Note also the countersunk holes, G, FIG. 4 which help to assure that the tapered head screws that attach the hanger to the saw remain tight.

We claim:

1. A two position hanger consisting of in combination with a portable power saw a rod bent into a square-ended horseshoe shape, 2 pins inserted through one section of said rod, and a u-shaped bracket which is drilled through the two parallel sections of said u-shaped bracket to receive said rod, the bracket stamped with the detents to seat one pin, a spring the other pin compressing said spring between said bracket and said other pin said, bracket in combination with said spring pins, and detents providing an indexing mechanism for said bracket being fixed to said power saw, and said horseshoe shaped rod acting as a hanger for saw power saw.

2. The combination of claim 1, wherein two tapered head screws fix said u-shaped bracket to said power saw, in counter sunk holes in the hanger bracket, and through existing holes in the right hand side of the front handle of said power saw, into existing threaded holes in the saw frame, the rod indexed by means of spring, pins, and detents to 90 degrees from the bracket.

3. The combination of claim 2 wherein said stamped detents are two in number and set at 90 degrees to each other in retain said horseshoe shaped rod in a flush or protruding position relative to said power saw.

* * * * *